United States Patent [19]
McClintock

[11] 3,984,707
[45] Oct. 5, 1976

[54] SPRING RETURN LINEAR SIGNAL GENERATOR

[76] Inventor: Richard D. McClintock, Washington Road, Woodbury, Conn. 06798

[22] Filed: July 13, 1973

[21] Appl. No.: 378,916

[52] U.S. Cl. .................................. 310/15; 310/30
[51] Int. Cl.² ........................................ H02K 35/02
[58] Field of Search ............................ 310/12–15, 310/30

[56] References Cited
UNITED STATES PATENTS

| | | | |
|---|---|---|---|
| 2,764,020 | 9/1956 | Gadd | 310/30 X |
| 3,130,332 | 4/1964 | Zehfeld et al. | 310/15 |
| 3,132,268 | 5/1964 | Abel et al. | 310/15 |
| 3,398,302 | 8/1968 | Harnau et al. | 310/154 |
| 3,693,033 | 9/1972 | Troesh | 310/15 |
| 3,718,828 | 2/1973 | Brittou et al. | 310/15 |

Primary Examiner—Donovan F. Duggan
Attorney, Agent, or Firm—Hubbell, Cohen, Stiefel & Gross

[57] ABSTRACT

A linear signal generator, that is one operating axially as opposed to a rotating generator comprises a housing, an annular electric coil mounted about the longitudinal axis of the housing, a permanent magnet resiliently mounted for movement along the longitudinal axis of the housing through the annular coil, and means for removably latching the magnet at one end of the housing. The magnet is preferably resiliently mounted to a plunger which is depressible a sufficient amount to cause the magnet to pass into the coil and latch at the opposite end of the housing, such as by a magnetic latch. When the latching force is overcome, such as by release of the biased plunger having a biasing force in excess of the magnetic latching force, the magnet is rapidly axially propelled through the electric coil to a rest position at the opposite end of the housing where the cycle may again be repeated. The rapid passage of the magnet through the coil changes the flux of the magnetic field within the coil and causes the generation of a voltage which is proportional to the speed of movement of the magnet through the coil. The magnetic latch may comprise a magnetically permeable material, such as iron having an aperture therein which is sized to provide the maximum desirable latching force by reducing the area of the magnetically permeable material by a desired amount.

5 Claims, 3 Drawing Figures

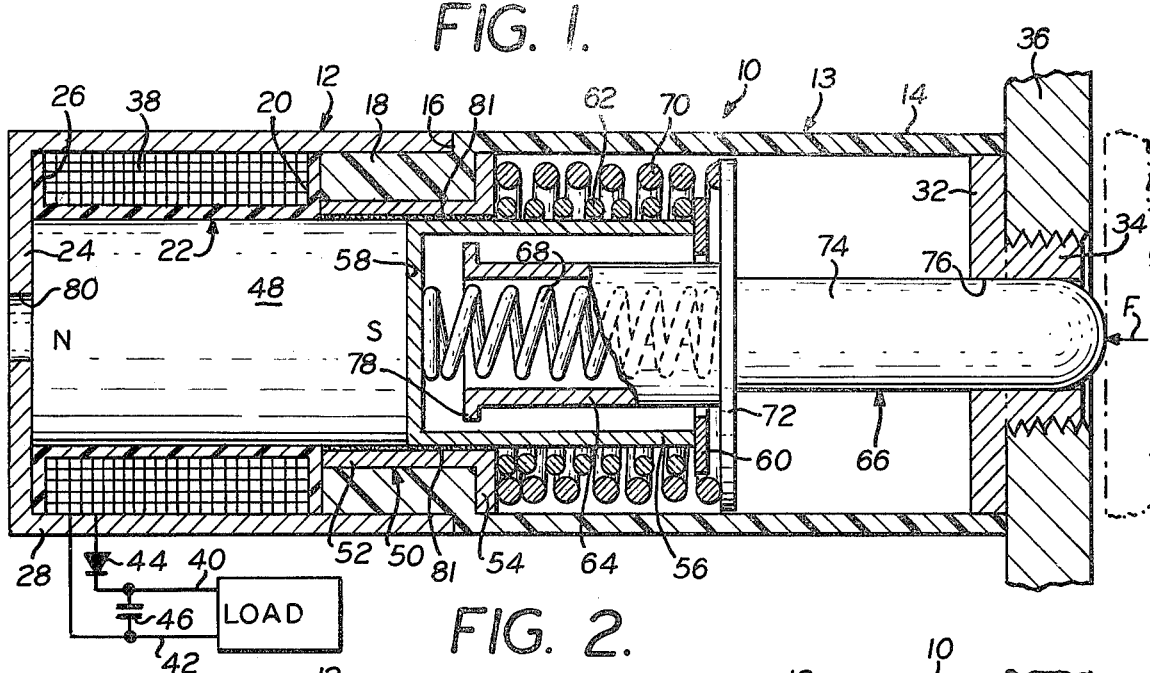
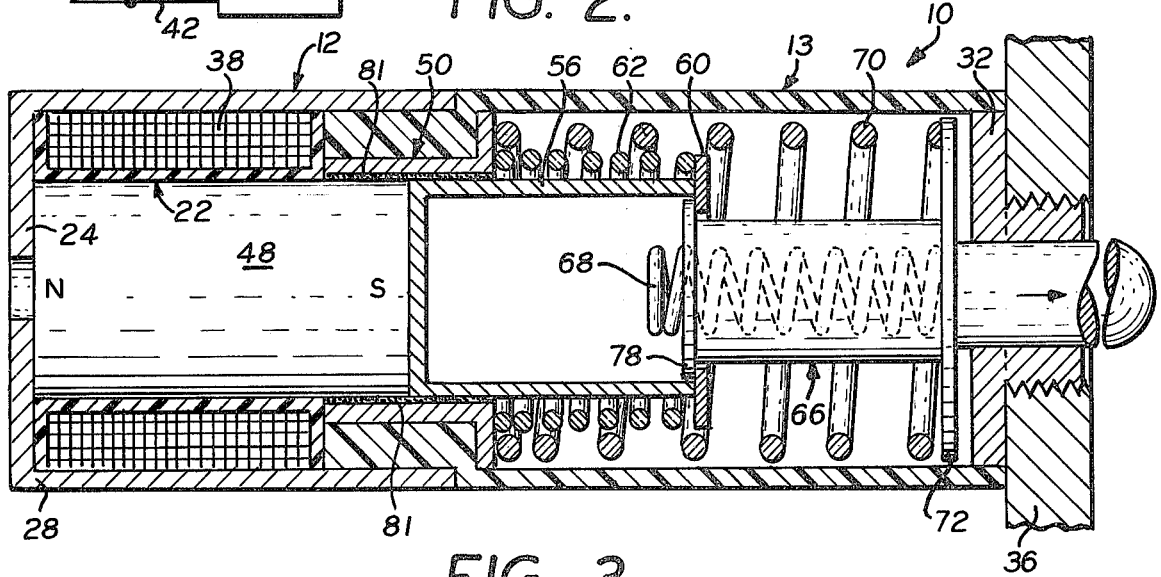
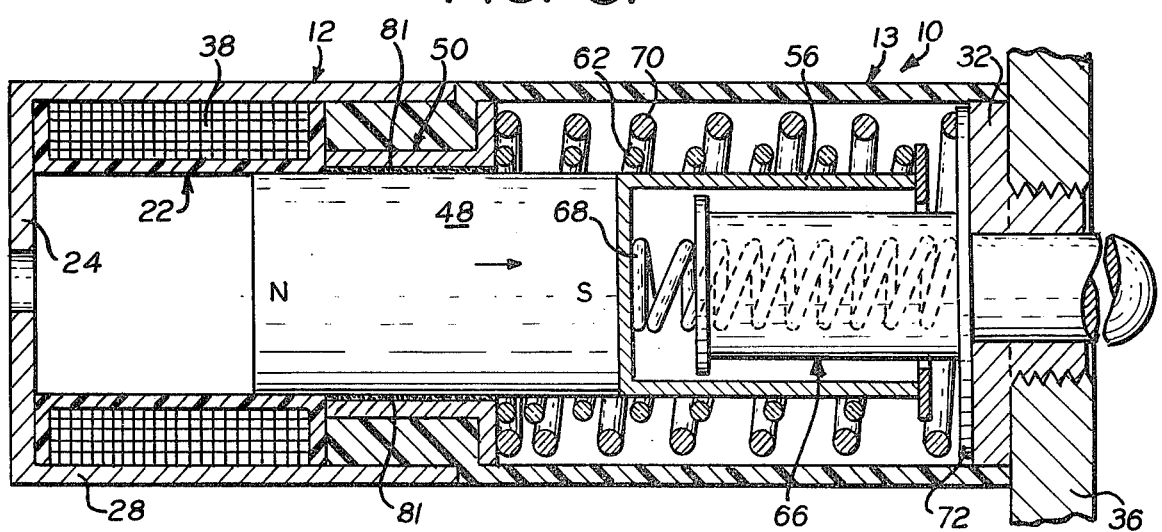

SPRING RETURN LINEAR SIGNAL GENERATOR

BACKGROUND OF THE INVENTION

1. Field of the Invention

The present invention relates to signal generators and more particularly such generators utilizing a magnet linearly moving through an electric coil to generate a signal pulse.

2. Description of the Prior Art

Signal generators such as ones capable of providing an output pulse of short duration are well known. An example of such a prior art device is disclosed in U.S. Pat. No. 2,813,988 which discloses a single shot pulse generator wherein means are provided for applying a mechanical force to a magnetic core within an electric coil causing the core to break up into a number of fragments which collapses the magnetic field associated therewith so as to cause electrical energy to be induced in the coil. However, this device is a one-time self destructive signal generation which is non-repetitive. Spring drive of a reciprocating magnet through a field is well known in the area of reciprocating motors, such as disclosed in U.S. Pat. Nos. 3,542,495; 3,430,120; 3,119,940 and 1,619,677; however, such a prior art device cannot be utilized as a linear signal generator.

There are many existing prior art devices which are energized by short duration electric pulses, such as explosive detonators, automatic garage door openers, and various other signalling devices, such as in an alarm system. Several of these devices are battery powered with the resultant associated problems, such as due to battery failure, deterioration, or leakage. For such reasons, prior art attempts have been made to provide a batteryless, mechanically operated generator, such as the self destructive type discussed above, one employing a vibrating reed which changes the flux in a magnetic circuit, or a conventional rotating armature type of generator.

SUMMARY OF THE INVENTION

A linear signal generator is provided in accordance with the present invention, such as an electric current or voltage generator. The generator comprises a housing, an annular electric coil mounted about the longitudinal axis of the housing, a permanent magnet resiliently mounted for movement along the longitudinal axis of the housing through the annular coil, and means for removably latching the magnet at one end of the housing, such as within the coil. The permanent magnet is normally magnetically latched at said end on one end wall of the housing, that wall being of a magnetically permeable material, by the magnetic force generated by the permanent magnet. The coil is mounted adjacent the path of movement of the permanent magnet and is responsive to the changing flux field due to the rapid movement of the magnet through the coil. The voltage or current generated due to this movement is proportional to the speed of such movement through the coil. An actuating plunger is mounted for movement along the axis of the housing and has a portion that is resiliently engageable with the permanent magnet to push the permanent magnet into latching engagement with the magnetic end of the housing. The outer end portion of the actuating plunger preferably projects out through the other end of the housing.

The permanent magnet is biased by a power spring that is compressed between an element associated with the permanent magnet and the housing, the force generated by the power spring being less than the magnetic latching force between the permanent magnet and the end wall of the housing. This actuating plunger is, in turn, spring-loaded by a plunger spring to bias the plunger in a direction out of the housing.

The generator is readied for operation by depressing the plunger into the housing, thereby pushing the permanent magnet into magnetic latching engagement with the end wall where it resides until the plunger is allowed to move away from the magnet and a lost-motion coupling between the plunger and the permanent magnet becomes engaged, thereby adding the plunger spring force to the power spring force to produce a total combined biasing force in excess of the magnetic latching force. Engagement of the lost-motion coupling occurs after the plunger has moved a substantial distance out of the housing so that the inner end of the plunger is spaced a substantial distance from the permanent magnet, which at that point remains in latched position. When the lost-motion coupling is engaged and the forces of the power and plunger springs are added to release the permanent magnet, the power spring rapidly drives the permanent magnet axially, thereby altering the flux field in the coil and inducing an electric current flow in a circuit connected to the coil. This cycle may be continually repeated as desired. Inasmuch as the magnetic force and the spring forces are substantially uniform on each firing, the force system of the device ensures production of current or voltage pulses having uniform characteristics on each firing. If desired, this generated signal may be stored in a diode-capacitor network.

The magnetic latch discussed above may comprise a magnetically permeable material, such as iron, having an aperture therein which is sized to provide the maximum desirable latching force by controllably reducing the area of the magnetically permeable material by a desired amount.

BRIEF DESCRIPTION OF THE DRAWING

FIG. 1 is a side elevation in cross-section, partially in schematic, of the preferred embodiment of the present invention, illustrating it in a latched and loaded position ready for firing;

FIG. 2 is a side elevation in cross-section similar to FIG. 1, but illustrating the device just prior to firing; and FIG. 3 is a side elevation in cross-section similar to FIG. 1, illustrating the device at the end of a firing.

DETAILED DESCRIPTION OF THE PREFERRED EMBODIMENT

Referring now to the drawings in detail, the linear signal generator preferably comprises a cylindrical housing, preferably having at one end a cup-shaped section 12 made of a magnetically permeable material, such as iron. Another section 13 of the housing 10 is preferably made of a nonmagnetic or magnetic material and includes a cylindrical main body portion 14, an inwardly extending flange portion 16, and a second cylindrical portion 18 offset inwardly from the main portion 14. Alternatively section 18 may contain an additional annular electric coil (not shown). A nonmagnetic bobbin 22 having outwardly extending flanges 20 and 26 is received within the housing section 12 between the end of the section 13 and a rear wall 24 which constitutes part of the section 12. The other end of the housing 10 receives an end closure 32. If desired, this end closure 32 may have a forwardly-extending threaded boss 34 for attaching the generator to a mounting plate 36, or the generator may be hand-held.

Preferably an annular electric coil 38 is wound on the bobbin 22 and is located between the rearward end of the magnetic section 12 of the housing and the cylindrical portion 18 of the nonmagnetic section 13 of the housing. A pair of leads 40 and 42 preferably extend from the coil and may be connected to any appropriate circuit through these coil leads 40 and 42 for conduction of pulses of electric current through such a circuit. For example, as shown schematically in FIG. 1, a diode 44 is preferably connected in one of the leads 40 and allows only unidirectional flow of electric current in a circuit connected to the coil, and a capacitor 46 is preferably connected in parallel across leads 40 and 42 and preferably serves as a low pass filter. Such an arrangement is illustrative of power supply control components that can be used in a circuit connected to the generator if desired.

The space within the housing defined within the cylindrical bobbin 22 preferably receives a permanent magnet 48, the magnet being linearly movable substantially longitudinally along the axis of the housing. In the position illustrated in FIGS. 1 and 2, the generator has been preloaded and is ready for firing. In this position, the magnetic force generated by the permanent magnet 48 preferably latches or holds the permanent magnet to the end wall 24 of the magnetic section 12 of the housing 10, end wall 24 being a magnetically permeable material, such as iron, and comprising a magnetic latch. An insert 50 of a magnetic material, such as iron, having a cylindrical portion 52 and an outwardly extending flange 54 is preferably received between the portion of the magnet 48 that extends out of the opening within the coil 38 and completes a magnetic circuit of generally toroidal shape, consisting of the permanent magnet 48, the insert 50, and the magnetic section 12 of the housing.

A cup-like extension piece 56 is secured to the front face 58 of the permanent magnet 48, and is provided with a flange 60 having inwardly and outwardly extending portions at its free end. A power spring 52 is provided which is compressible between the flange 54 of the insert 50 and the outwardly extending portion of the flange 60 on the extension piece 56. The power spring 62 is illustrated in the compressed position in FIG. 1, preferably preloaded with a force that is less than the magnetic force by which the permanent magnet 48 is held in magnetically latched position on the end wall 24 of the housing. The space within the cylindrical portion of the extension piece 56 preferably receives an inner end portion 64 of an actuating plunger 66, the portion 64 preferably being provided with an internal axial bore and a shock absorbing spring 68 being received in the bore. A plunger spring 70 is provided which is compressible between an outwardly extending annular flange 72 on the plunger and the flange 54 on the insert 50. The plunger 66 preferably includes a portion 74 that extends out of the housing through an opening 76, the outer end of the actuating plunger projecting out of the housing as illustrated in FIG. 1.

In the position illustrated in FIG. 1, the generator has been preloaded or armed in readiness for firing, such as by depression of a plunger 66 by thumb pressure. Subsequent to a previous firing, as described below, the plunger 66 is depressed to move axially toward the left (as the device is shown in the drawing), to thereby engage the shock absorbing spring 68 with the permanent magnet 48 and move the permanent magnet 48 into latching engagement in which it is held by its magnetic force on the end wall 24 of the magnetic section 12 of the housing. The plunger is preferably moved to and held in the position illustrated in FIG. 1 by a mechanical or manual force applied to the outer end of the plunger, represented by the arrow "F" in FIG. 1. The force F may be imposed by, for example, a thumb or any other means acting on the plunger such as, if mounted, a means interposed in an opening in which the generator is mounted. As long as the force F is imposed on the plunger, the generator remains in an armed or ready condition.

Referring to FIG. 2, releasing the force F allows the plunger spring 70 to shift the plunger 66 to the right. Meanwhile, inasmuch as the power spring force is less than the magnetic latching force which holds the permanent magnet 48 against the end wall 24, the permanent magnet remains stationary in the ready-to-fire position. At some point, preferably near the end of the stroke of the plunger 66 to the right, an outwardly extending flange 78 on the end of the inner portion 64 of the plunger 66 engages the inwardly extending portion of the flange 60 on the extension piece 56, the two flanges constituting a lost-motion coupling arrangement between the plunger and the permanent magnet. Upon such engagement of the flanges as illustrated in FIG. 2, the force of the plunger spring 70 becomes added to the force of the power spring 62, and the combined forces of the two springs exceeds the magnetic latching force holding the permanent magnet latched to the end wall 24 of the housing. A small additional increment of movement to the right beyond the position illustrated in FIG. 2 pulls the permanent magnet away from the end wall, the magnet latching force being commensurately diminished to a point that is below the force generated by the operating spring 62. Consequently, the power spring 62 becomes a dominant force and drives the permanent magnet 48 to the right.

A vent hole 80 in the end wall 24 of the housing is provided. As was previously stated, this end wall 24 is preferably composed of a magnetically permeable material, such as iron, and comprises the magnetic latch for magnet 48. The hole or aperture 80 is preferably sized to provide the maximum desirable latching force by reducing the area of the magnetically permeable material in the vicinity of the flux field by a desired amount. This reduction in area provides a higher $B^2\phi$ factor, where B is the magnetic field strength and $\phi$ is the magnetic flux, due to a resultant increase in B with reduction in area. However, the reduction in area is chosen so as to also preferably not reduce $\phi$ by too great an amount. Thus, the reduction in area provides a higher latching force. The vent hole 80 also serves to vent the housing so that a partial vacuum will not be generated behind the moving magnet.

The magnet 48 is preferably guided by the inner wall of the bobbin 22, but preferably the magnet and magnet extension are in clearance relation with the insert 50 to minimize contact demagnetization. A guide 81 preferably supports the magnet in the extended position. The movement of the permanent magnet 48 relative to the other components of the magnetic circuit alters the flux field in the magnetic circuit and induces a voltage in the coil 38, which results in an electric current flow in the circuit to which the coil 38 is connected.

As may be seen from FIG. 3, the permanent magnet 48 is permitted to move a substantial distance axially with respect to the housing until the shock absorbing spring 68 within the plunger 66 decelerates and stops it, absorbing the impact energy in the process. In the position after firing of the generator, which is the position of the components illustrated in FIG. 3, the power spring 62 and plunger spring 70 hold the plunger 66 and the permanent magnet 48 in the positions illustrated in FIG. 3. The generator is re-armed for another firing by depressing the plunger 66 to the left, thereby restoring the components to the positions illustrated in FIG. 1, whereby the generation cycle may be repeated. If the device is utilized as a hand-held generator, the thumb depresses and releases the plunger 66 to alternately latch and unlatch the magnet 48 (when the combined biasing force of the springs exceeds the latching force, the released plunger 66 will cause the magnet 48 to axially move through the coil 38) to generate current pulses.

Thus, there is provided in accordance with the invention, a novel and improved signal generator which may be armed and allowed to fire any time the latching force is overcome. The force system acting on the permanent magnet, which constitutes the linearly or axially movable armature of the generator, provides for substantially uniform characteristics in the electric current generated by the device.

It is to be understood that the above-described embodiment of the invention is merely illustrative of the principles thereof, and that numerous modifications and embodiments of the invention may be derived within the spirit and scope thereof, such as by providing a vent hole in section 13 or end closure 32. It should be noted that, preferably, all of the toroidal magnetic circuits can be slotted to prevent eddy currents.

What is claimed is:

1. A linear signal generator comprising a housing having a longitudinal axis, an annular coil of electrically conductive material mounted about said longitudinal axis and extending in a direction along a portion thereof, a permanent magnet means resiliently mounted within said housing for repetitive axial movement along said longitudinal axis through said coil, said magnet creating a magnetic flux field, said coil being within said magnetic flux field, substantially all of the output flux of said magnet completely threading said coil, said resiliently mounted magnet comprising a permanent magnet and a compressible spring means, said generator further comprising means for moving said magnet in a first direction along said axis to compress said spring means to a loaded condition, said spring means having an associated return biasing force in said loaded condition, said housing further comprising means for latching said magnet at least substantially at one end of said annular coil with a latching force, said magnet remaining latched with said latching force until said return biasing force exceeds said latching force, said spring means thereafter propelling said magnet means through said annular electric coil toward the other end thereof, said propelled magnet producing a change in said magnetic flux field, said coil being responsive to a change in said flux field, whereby an electric current pulse is generated due to said propelled magnet movement.

2. A generator in accordance with claim 1 wherein said housing comprises a magnetically permeable portion at one end thereof, said coil being mounted adjacent said one end, said one end comprising said latching means when said magnet is substantially in engagement therewith, said one end portion comprising an aperture therein which is of a predetermined diameter sufficient to reduce the engageable area of said magnetically permeable portion and increase said latching force, said reduced area having a higher $B^2\phi$ than said one end portion without said reduction in area.

3. A generator in accordance with claim 1 wherein said magnet moving means comprises a plunger means mounted for movement along said axis, said plunger having an outer end portion and an inner end portion, said inner end portion being engageable with said permanent magnet in a first position in which the plunger is depressed into said housing a sufficient amount to move said magnet into engagement with said one end, said spring means comprises a power spring compressible between said housing and said magnet and adapted to drive said magnet through said coil in a direction from said one end toward said other end and a plunger spring compressible between said housing and said plunger and adapted to drive said plunger in a direction out of said housing and lost-motion coupling means associated with said magnet and said plunger and engageable therebetween in a second position of said plunger in which said plunger inner end is spaced a substantial distance from said magnet, such engagement resulting in the addition of the return biasing forces generated by the plunger spring and power spring, the return biasing force generated by the power spring being less than the magnetic latching force holding the magnet latched at said one end such that said magnet remains latched at said one end until such addition of the spring forces, the combined return biasing forces of the power and plunger springs being substantially greater than the magnetic latching force holding said magnet latched at said one end such that said magnet is unlatched from engagement and is driven by said power spring along said axis, whereby a change in the magnetic flux field is produced and an electric current flow is induced in said coil.

4. A generator in accordance with claim 1 further comprising a shock absorbing element engageable between said plunger and said magnet for absorbing impact energy at the end of the driven movement of said magnet.

5. A generator in accordance with claim 4, wherein said shock absorbing element is a spring mounted on said plunger, said spring comprising the inner end portion of said plunger engageable with said magnet.

* * * * *